United States Patent
Miike

[11] Patent Number: 6,111,827
[45] Date of Patent: Aug. 29, 2000

[54] OPTICAL PICKUP, AND OPTICAL DISC PLAYER

[75] Inventor: Masami Miike, Kanagawa, Japan

[73] Assignee: Sony Corporation, Tokyo, Japan

[21] Appl. No.: 09/081,633

[22] Filed: May 20, 1998

[30] Foreign Application Priority Data

May 26, 1997 [JP] Japan ..................................... 9-135620

[51] Int. Cl.⁷ .................................................... G11B 7/00
[52] U.S. Cl. .......................... 369/44.14; 369/112; 369/58
[58] Field of Search ............................ 369/44.12, 44.13, 369/44.14, 112, 44.19, 58; 359/814, 813, 824, 823

[56] References Cited

U.S. PATENT DOCUMENTS

| | | | |
|---|---|---|---|
| 5,132,534 | 7/1992 | Namigawara | 250/239 |
| 5,724,337 | 3/1998 | Kawano et al. | 369/44.14 |
| 5,777,959 | 6/1996 | Nakagawa et al. | 369/44.14 |
| 5,870,371 | 12/1995 | Tsuchiya et al. | 369/44.14 |

FOREIGN PATENT DOCUMENTS

| | | |
|---|---|---|
| 8-203110 | 8/1996 | Japan . |
| 8-315389 | 11/1996 | Japan . |
| 9-50637 | 2/1997 | Japan . |
| 9-91732 | 4/1997 | Japan . |

*Primary Examiner*—Nabil Hindi
*Attorney, Agent, or Firm*—Ronald P. Kananen; Rader, Fishman & Grauer

[57] ABSTRACT

An optical pickup, and an optical disc player incorporating the same, are disclosed which are capable of an easy and good adjustment of the objective lens skew, compact in the optical-axial direction of the objective lens, and having a reducible light-projected area in a plane perpendicular to the optical axis. The optical pickup comprises a light source to emit a light beam; a frame having provided therein photo-detectors upon which incoming light beam is incident; an objective lens; an objective lens driving mechanism to support the objective lens movably in a direction parallel to the optical axis of the objective lens; and a support plate installed on the frame to fix the objective lens driving mechanism; the objective lens driving mechanism support plate being mounted on the frame with a spherical adjusting mechanism provided between them, the spherical adjusting mechanism being located at the lateral sides of the objective lens supported by the objecting lens driving mechanism, the support plate for the objective lens driving mechanism being mounted on the frame by means of the spherical adjusting mechanism, the support plate being fixed after adjusted in position and/or angle along the spherical adjusting mechanism.

22 Claims, 9 Drawing Sheets

OPTICAL PICKUP, AND OPTICAL DISC PLAYER

BACKGROUND OF THE INVENTION

1. Field of the Invention

The present invention relates to an optical pickup, and an optical disc player, for writing and/or reading an information signal into and/or from a disc-like optical recording medium such as an optical disc and magneto-optic disc.

2. Description of Related Art

Disc-like optical recording media including optical discs and magneto-optic discs have been proposed as information signal recording media, and optical pickups for writing and/or reading information signal into and/or from such disc-like optical recording media, have also been proposed. Such a disc-like optical recording medium comprises a clear substrate made of a clear material such as polycarbonate, and a signal recording layer formed, by coating, on one of the main sides of the clear substrate.

FIG. 1 is an axial-sectional view showing the construction of such a conventional optical pickup. As shown, the optical pickup typically comprises a frame 201, and a semiconductor laser 202 as a light source and a photodetector 207 provided inside the frame 201. A light beam generated by the semiconductor laser 202 travels through a beam splitter 203 and a collimator lens 204, and then it is incident upon an objective lens 205. This objective lens 205 is movably supported by a biaxial actuator 206 supported on a support plate 210 mounted on the frame 201.

The laser beam incident upon the objective lens 205 is focused, by the objective lens 205, onto a signal recording surface of the disc-like optical recording medium. At this time, the laser beam is first incident upon the clear substrate of the disc-like optical recording medium, passes through the clear substrate and focused onto the signal recording surface being the surface of a signal recording layer. The objective lens 205 is moved by the biaxial actuator 206 to always focus the laser beam onto a position on the signal recording surface where the information signal is to be recorded, that is to say, onto a recording track. The recording track is spirally formed on the main side of the disc-like optical recording medium.

In the disc-like optical recording medium, the information signal is written or read at or from the spot of the laser beam focused by the objective lens 205.

The laser beam focused onto the signal recording surface is modulated in amount of light or polarizing direction correspondingly to the information signal recorded there on the signal recording surface, and reflected by the signal recording surface, and returns to the objective lens 205.

The reflected light beam from the signal recording surface travels through the objective lens 205, collimator lens 204 and beam splitter 203, and then it is incident upon a photodetector 207. The photodetector 207 is a light detection element like a photodiode. It detects the reflected laser beam coming from the disc-like optical recording medium through the objective lens 205, and converts it to an electrical signal. The information signal recorded in the disc-like optical recording medium is reproduced based on the electrical signal output from the photodetector 207.

Also, based on the electrical signal delivered from the photodetector 207, there will be generated a focus error signal indicative of a distance between a spot of the light beam focused by the objective lens 205 and the signal recording surface in the direction of the optical axis of the objective lens 205, and a tracking error signal indicative of a distance between the light beam-focused spot and the recording track on the signal recording surface in the radial direction of the disc-like optical recording medium. The biaxial actuator 206 is controlled based on these focus and tracking error signals to move the objective lens 205 until each of the error signals is reduced to zero.

Optical recording media of the above-mentioned disc-like type and having a higher density of information signal recording have been demanded and thus are under research and development for use as auxiliary storage units for computers, and audio and video signal recording media.

For writing and reading information signal into and/or from a disc-like optical recording medium having thus a high capability of recording, the objective lens 205 should be designed to have a larger NA (numerical aperture) and the light source should be made to generate a light beam of a shorter wavelength to reduce the size of a focused spot of the light beam on the disc-like optical recording medium.

With a larger NA of the objective lens 205, however, the allowances for skew of the objective lens 205 in relation to the disc-like optical recording medium, for thickness non-uniformity of the clear substrate in the medium, and for defocusing of the light beam on the medium, will be smaller with the consequence that it is difficult to write and read information signal into the disc-like optical recording medium.

For example, when the objective lens 205 skews in relation to the disc-like optical recording medium, a wave-front aberration will take place in the light beam focused onto the signal recording surface, and have an influence on an RF output which is an electrical signal output from the photodetector 207. In the wave-front aberration, a third-order comatic aberration prevails. The third-order comatic aberration will take place in proportion to the NA of the objective lens 205 to the third power, and also to the skew angle of the disc-like optical recording medium to about the first power. Therefore, the allowance for skew of the objective lens 205 is in inverse proportion to the third power of the NA of the objective lens, so that with a larger NA, the allowance becomes smaller.

Therefore, in the optical pickup, the mounting angle of the biaxial actuator 206 in relation to the frame 201 incorporating the light source is adjusted to keep the objective lens 205 from skewing in relation to the disc-like optical recording medium.

To adjust such a mounting angle, a spherical adjusting mechanism has been proposed which comprises a spherical convexity 208 formed on the bottom of a support plate 210 abutting on the frame 201, and a spherical concavity 209 formed on the top of the frame 201 on which the support plate 210 abuts and in which the spherical convexity 208 is fitted, as shown in FIG. 1. The center of curvature of the spherical convexity 208 is located at a position on the optical axis of the objective lens 205 where the focused spot of the light beam having passed through the objective lens 205 skewed about the center of curvature will be least off a focused spot which would be when the light beam passes through the objective lens 205 not skewed.

When adjusting the mounting angle of the support plate 210 in relation to the frame 201, the support plate 210 is pressed toward the frame 201 under the action of an resilient member like a spring, and turned along the spherical concavity 209 with the spherical convexity 208 kept fitted in the spherical concavity 209. After completion of the adjustment of the mounting angle of the support plate 210 with respect to the frame 201, the support plate 210 is fixed to the frame 201 with a screw or the like.

FIG. 2 is a side elevation showing the construction of another conventional optical pickup. As seen, the frame 201 is ridged at 211 on the top thereof to support the support plate 210 nearly at its center. This is another solution having been proposed by far to adjust the mounting angle of the biaxial actuator 206.

In this second conventional mounting-angle adjusting mechanism, the support plate 210 has a support screw 213 and an adjusting screw 212 provided in one end and the other end, respectively, thereof. The support screw 213 and adjusting screw 212 are driven in the frame 201. Also a compression spring 214 is provided between the head of the support screw 213 and the support plate 210. The compression spring 214 presses the support plate 210 toward the frame 201 as indicated with an arrow a in FIG. 2. The head of the adjusting screw 212 abuts on the support plate 210. By adjusting the driven depth of the adjusting screw 212 in the frame 201, the support plate 210 is turned about the ridge 211 as indicated with an arrow b in FIG. 2 and thus the skew of the support plate 210 in relation to the frame 201 is adjusted.

However, the optical pickup having the above-mentioned spherical adjusting mechanism is disadvantageous in that the thickness of the optical pickup cannot be reduced, that is to say, the optical pickup cannot be designed more compact in the optical-axial direction of the objective lens 205. This is because for a reduced thickness of the optical pickup, the spherical convexity 208 has to be supported at the lateral sides thereof from below and an erroneous radius of curvature, indicated with an arrow r in FIG. 1, of the spherical convexity 208 will result in an erroneous optical-axial direction of the objective lens 205.

Also, the optical pickup having the mounting-angle adjusting mechanism in which the support plate 210 is supported on the ridge 211 is disadvantageous in that the area of light projection in the horizontal direction, namely, in a plane perpendicular to the optical axis of the objective lens 205, will be larger. This is because the frame 201 should have some portions thereof used for receiving the adjusting screw 212 and support screw 213.

Furthermore, the mounting-angle adjusting mechanism has a problem that the angle adjustment can be done only around one axial direction parallel to the ridge 211 and the spacing of this pivot from the objective lens 205 will cause the focused spot of the incoming light beam from the objective lens 205 to be largely off a desired position.

SUMMARY OF THE INVENTION

Accordingly, the present invention has an object to overcome the above-mentioned drawbacks of the prior art by providing an optical pickup, and an optical disc player incorporating the optical pickup, capable of an easy and good adjustment of the objective lens skew, compact in the optical-axial direction of the objective lens, and having a reducible light-projected area in a plane perpendicular to the optical axis.

The above object can be accomplished by providing an optical pickup comprising, according to the present invention, a frame having a built-in light source, an objective lens, an objective lens driving mechanism, a support plate installed on the frame and to which the objective lens driving mechanism is fixed, and a spherical adjusting mechanism located at the lateral sides of the objective lens supported by the objecting lens driving mechanism, the support plate for the objective lens driving mechanism being mounted on the frame by means of the spherical adjusting mechanism, the support plate being fixed after being adjusted in position by turning along the spherical adjusting mechanism.

Since the spherical adjusting mechanism is provided at the lateral sides of the objective lens, an erroneous radius of curvature of the spherical surface of the spherical adjusting mechanism will not cause any positional error in the optical-axial direction of the objective lens, and a positional error in a direction perpendicular to the optical axis of the objective lens, if any, can be absorbed by adjusting the fixed position of the objective lens driving mechanism relative to the support plate for the objective lens driving mechanism.

BRIEF DESCRIPTION OF THE DRAWINGS

These objects and other objects, features and advantages of the present intention will become more apparent from the following detailed description of the preferred embodiments of the present invention when taken in conjunction with the accompanying drawings, of which.

DETAILED DESCRIPTION OF THE PREFERRED EMBODIMENTS

The present invention will be described hereinafter concerning the following:

(1) Types of disc-like optical recording media
(2) Supporting the optical pickup (3) Construction of biaxial actuator (objective lens driving mechanism)
(4) Construction of the spherical adjusting mechanism
(5) Internal construction of the frame
(6) Construction of the optical disc player The above will be described herebelow in this order:

(1) Types of disc-like optical recording medium

Figure 1:
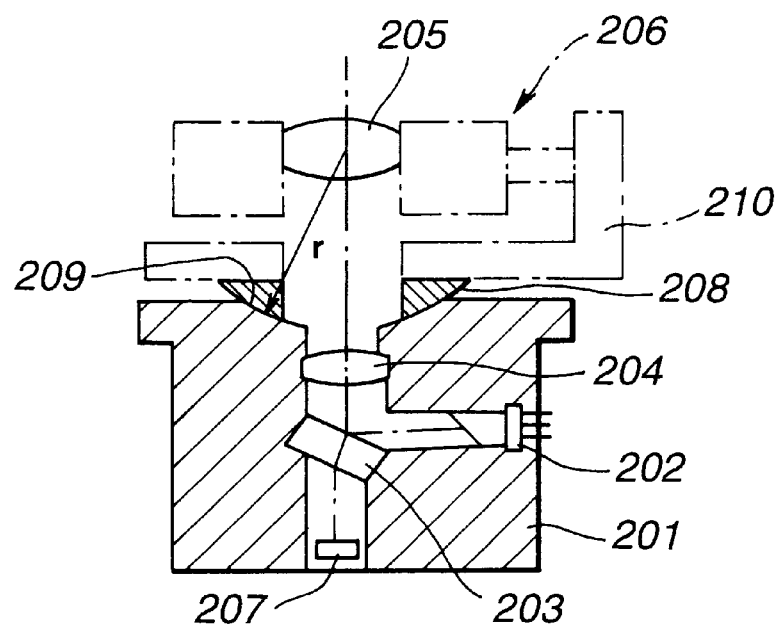
FIG. 1 is an axial-sectional view showing the construction of a conventional optical pickup.
Figure 2:
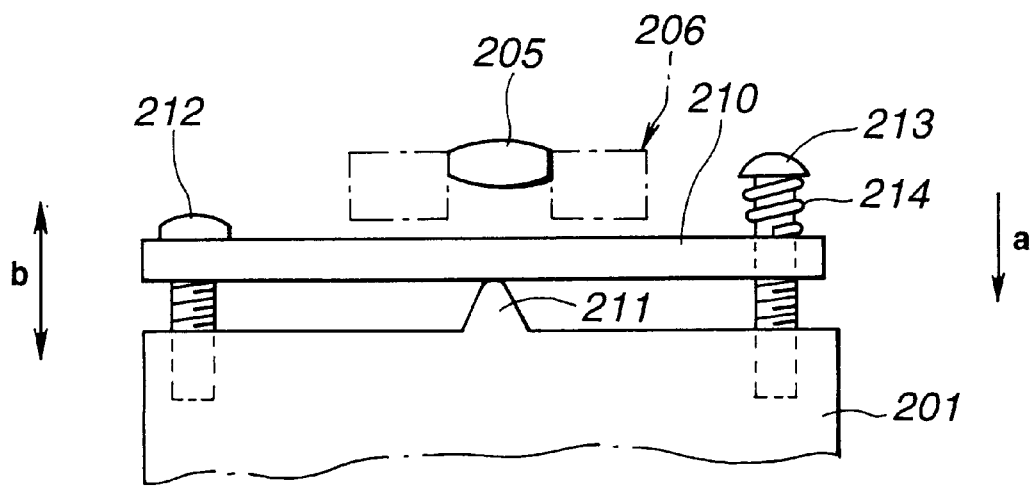
FIG. 2 is a side elevation showing the construction of another conventional optical pickup.
Figure 3:
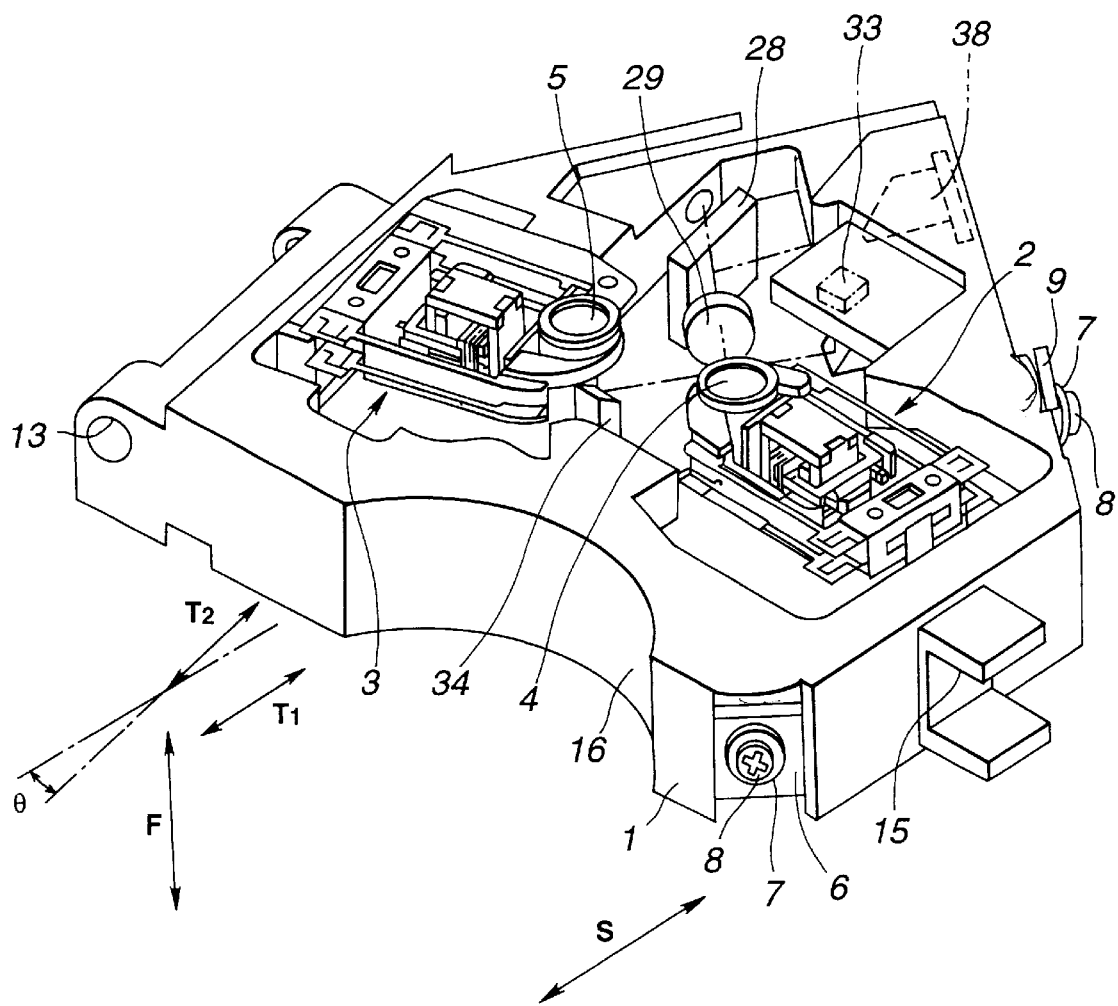
FIG. 3 is a perspective view showing the construction of the optical pickup according to the present invention.
Figure 5:
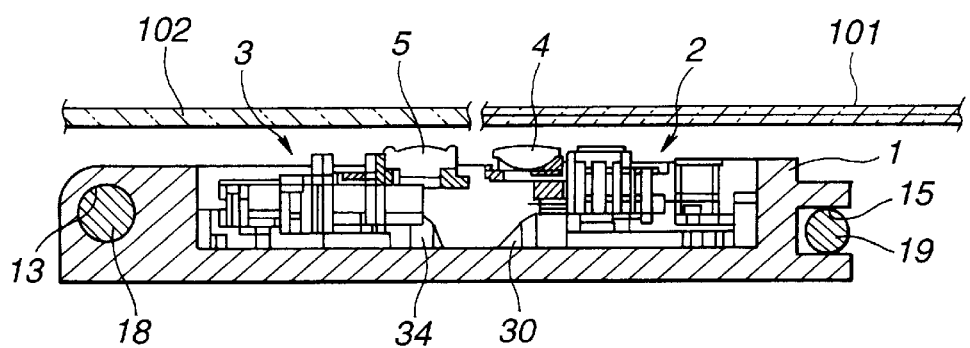
FIG. 5 is an axial-sectional view showing the optical pickup.

FIG. 3 is a perspective view showing the construction of the optical pickup according to the present invention. In this embodiment of the present invention, the optical pickup is designed for use with a first type of optical disc 101 (FIG. 5) being of a double side structure formed from two disc-like optical recording media discs each of which comprises a clear substrate made of a polycarbonate disc of 0.6 mm in thickness and 120 mm in diameter and has a signal recording layer formed on one of the main sides of the clear substrate, and which are attached to each other by lamination to a thickness of 1.2 mm, and also with a second type of optical disc 102 being a disc-like optical recording medium having a clear substrate of 1.2 mm in thickness. It is adapted to write and/or read information signal into and/or from each of these optical discs by irradiating a laser beam to the optical disc.

The first type of optical disc 101 is designed for information signal write and read with irradiation of a laser beam having a first wavelength of 635 nm (or 650 nm) through an objective lens having an NA (numerical aperture) of 0.6. Information signals are recorded along a recording track spirally formed in the signal recording layer.

The first type of optical disc 101 includes, for example, a so-called "digital video disc (DVD)" (brand name) currently commercially available.

The second type of optical disc 102 comprises a clear substrate made of a polycarbonate disc of 1.2 mm in thickness and 80 or 120 mm in diameter, and a signal recording layer formed on one of the main sides of the clear substrate.

The second type of optical disc 102 is designed for information signal write and read with irradiation of a laser beam having a second wavelength of 780 nm through an objective lens having an NA (numerical aperture) of 0.45. Information signals are recorded along a recording track spirally formed in the signal recording layer.

The second type of optical disc 102 includes, for example, a so-called "compact disc (CD)" (brand name), a so-called "CD-ROM", and a so-called "CD-R", all commercially available at present.

Figure 7:
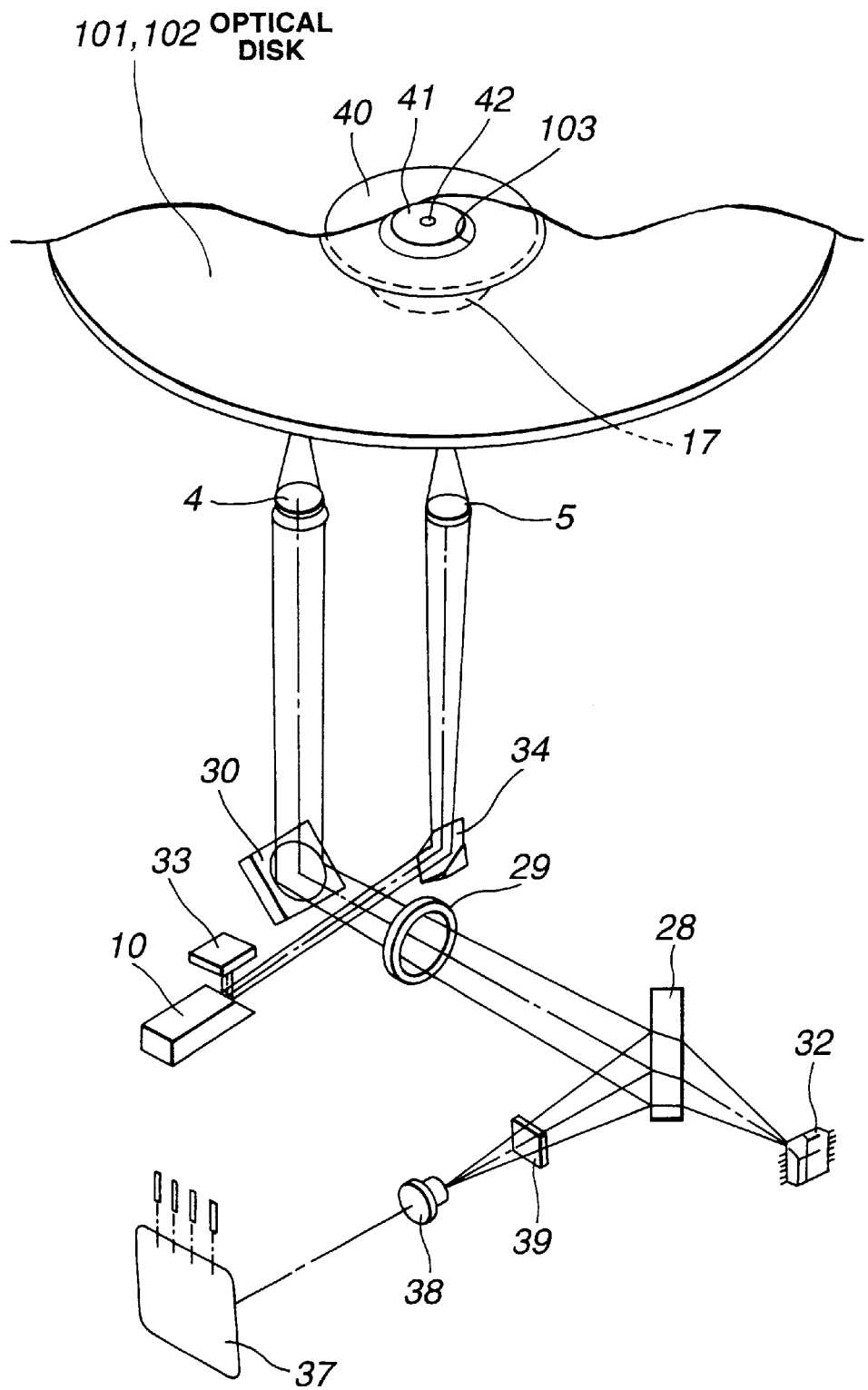
FIG. 7 is a perspective view showing the construction of an optical system of the optical pickup.

In the optical disc player comprising the optical pickup, also according to the present invention, the first or second type of optical disc 101 or 102 is spun by a spindle motor 17 installed on a chassis (not illustrated) as shown in FIG. 7. The spindle motor 17 has a drive shaft 42 on which a disc table 40 being a spinning drive is mounted. The disc table 40 is formed to have a generally disc-like shape, and has provided nearly in the center thereof a projection 41 having a general shape of a truncated cone. When placed in position on the disc table 40, the optical disc 101 or 102 has the projection 41 fitted in a chucking hole 103 formed in the center thereof. Thus the optical disc 101 or 102 is held at the center thereof by the projection 41. In effect, the optical disc 101 or 102 is held on the disc table 40 and spun along with the disc table 40 by the spindle motor 17.

(2) Supporting the optical pickup

Figure 4:
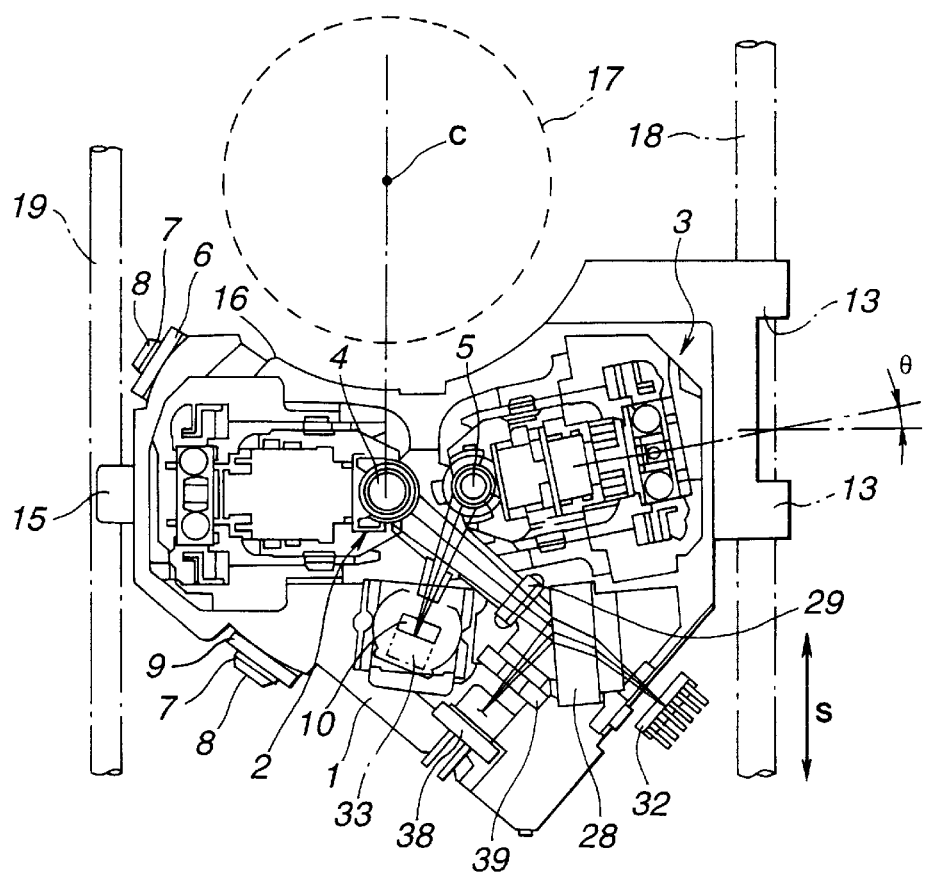
FIG. 4 is a plan view showing the construction of the optical pickup.

The optical pickup comprises a frame 1 movably supported by a guide shaft 18 and support shaft 19 disposed on the chassis (not illustrated), as shown in FIG. 4. The guide and support shafts 18 and 19 are disposed in parallel to each other, and also in parallel to the top of the disc table 40.

The frame 1 has a guide hole 13 in which the guide shaft 18 is penetrated and a support recess 15 in which the support shaft 19 is introduced, as shown in FIG. 3. As moved along the guide and support shaft 18 and 19, the frame 1 is moved in a direction toward and/or away from the spindle motor 17, that is to say, radially of the optical disc 101 or 102 while it is kept vis—vis to the main side of the optical disc 101 or 102 set at the top thereof on the disc table 40. The frame 1 is moved by a sled motor (not illustrated) disposed on the chassis.

It should be noted that the positional relation between the frame 1 and spindle motor 17, that is to say, the positional relation between the frame 1 and optical disc 101 or 102, may vary as the frame 1 is moved with the spindle motor 17 fixed, or reversely as the spindle motor 17 is moved with the frame 1 fixed, or furthermore as both the frame 1 and spindle motor 17 are moved, respectively.

(3) Construction of biaxial actuator

Although the clear substrate of the optical disc 101 or 102 is formed flat, it has a slight distortion in some cases. Thus, when the optical disc 101 or 102 having such a clear substrate is spun with the central portion thereof held on the disc table 40, it will incur a so-called axial deflection. More particularly, as the optical disc 101 or 102 is spun with its central portion held on the disc table 40, the signal recording layer of the optical disc 101 or 102 will move periodically in a direction towards or away from the optical pickup. Also, although the optical disc 101 or 102 has a recording track formed thereon to have a center of curvature coincident with the center of the clear substrate, the center of curvature may possibly be off the center of the clear substrate. In this case, as the clear substrate of the optical disc 101 or 102 is spun with its central portion held on the disc table 40, it will move periodically radially of the optical disc 101 or 102.

For the purpose of allowing the laser beam for write or read of information signal with respect to the optical disc 101 or 102 to follow up with an offset of the recording track due to an axial deflection or eccentricity of the optical disc 101 or 102, first and second biaxial actuators 2 and 3 forming the objective lens driving mechanism are provided as shown in FIG. 3. These biaxial actuators 2 and 3 are disposed on the frame 1 as will be seen from FIG. 6.

The first biaxial actuator 2 supports a first objective lens 4 movably in the optical-axial direction of the first objective lens 4, that is to say, in a focusing direction indicated with an arrow F in FIG. 3 and in a direction perpendicular to the optical-axial direction, namely, in a first tracking direction indicated with an arrow T1 in FIG. 3. The first objective lens 4 has an NA of 0.6.

The second biaxial actuator 3 supports a second objective lens 5 movably in the optical-axial direction of the second objective lens 5, that is to say, in a focusing direction indicated with an arrow F in FIG. 3 and in a direction perpendicular to the optical-axial direction, namely, in a second tracking direction indicated with an arrow T2 in FIG. 3. The second objective lens 5 has an NA of 0.45.

These first and second objective lenses 4 and 5 are disposed vis—vis to the signal recording layer of the optical disc 101 or 102, movably along the inner and outer circumferences of the optical disc 101 or 102 as indicated with an arrow S in FIG. 4 as the frame 1 is moved along the guide shaft 18 and support shaft 19. The objective lenses 4 and 5 are disposed in a direction generally perpendicular to the length of the guide shaft 18, namely, in the circumferential direction of the optical disc 101 or 102 set on the disc table 40. Also, the first and second objective lenses 4 and 5 are supported with their optical axes kept parallel to each other.

Figure 6:
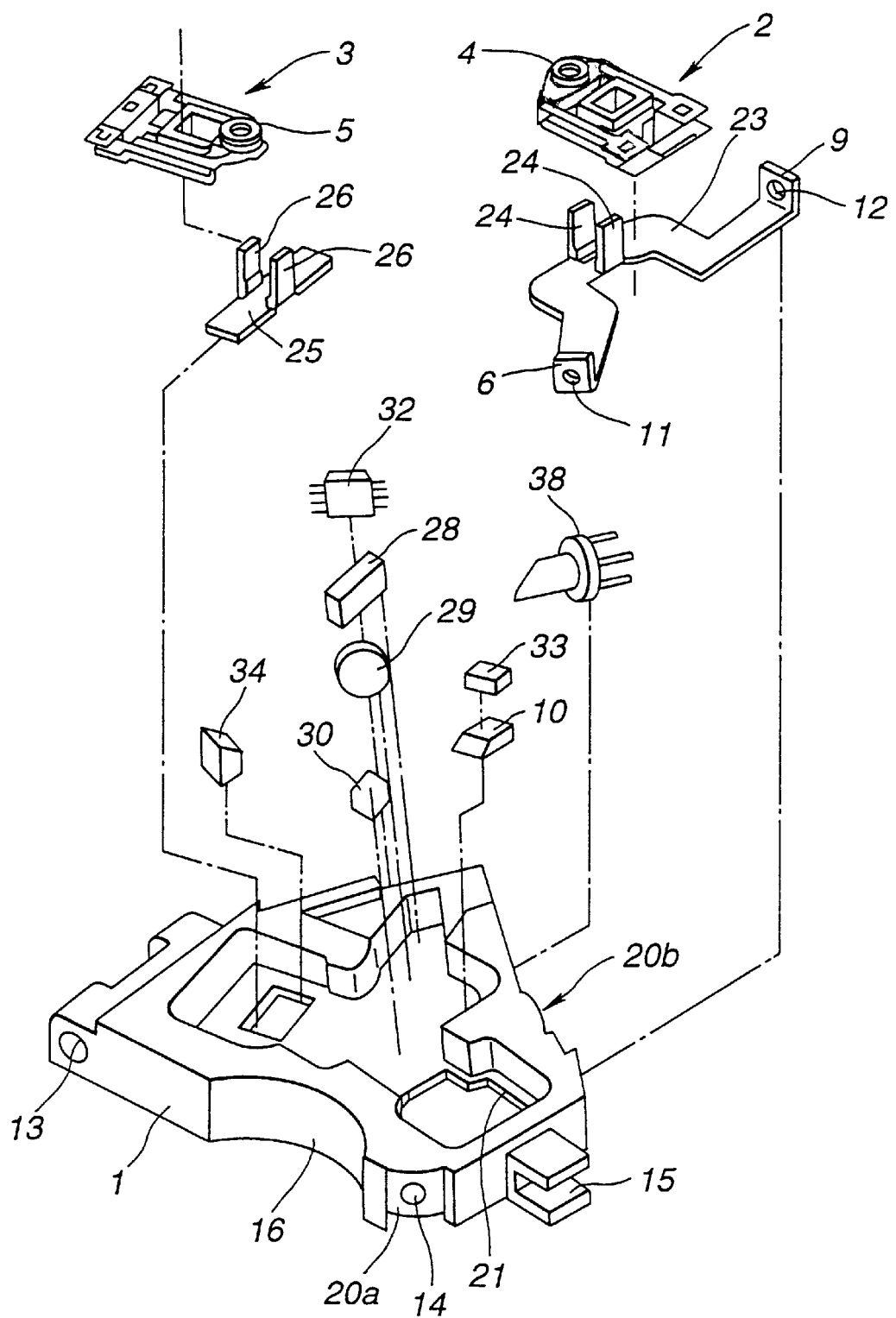
FIG. 6 is an exploded perspective view showing the construction of the optical pickup.

The first biaxial actuator 2 has a support plate 23 for the objective lens driving mechanism. As seen from FIG. 6, the support plate 23 is installed to the frame 1 by means of a spherical adjusting mechanism which will be further discussed later. The second actuator 3 has a yoke 25 fixed to the frame 1 as shown in FIG. 6.

Figure 8:
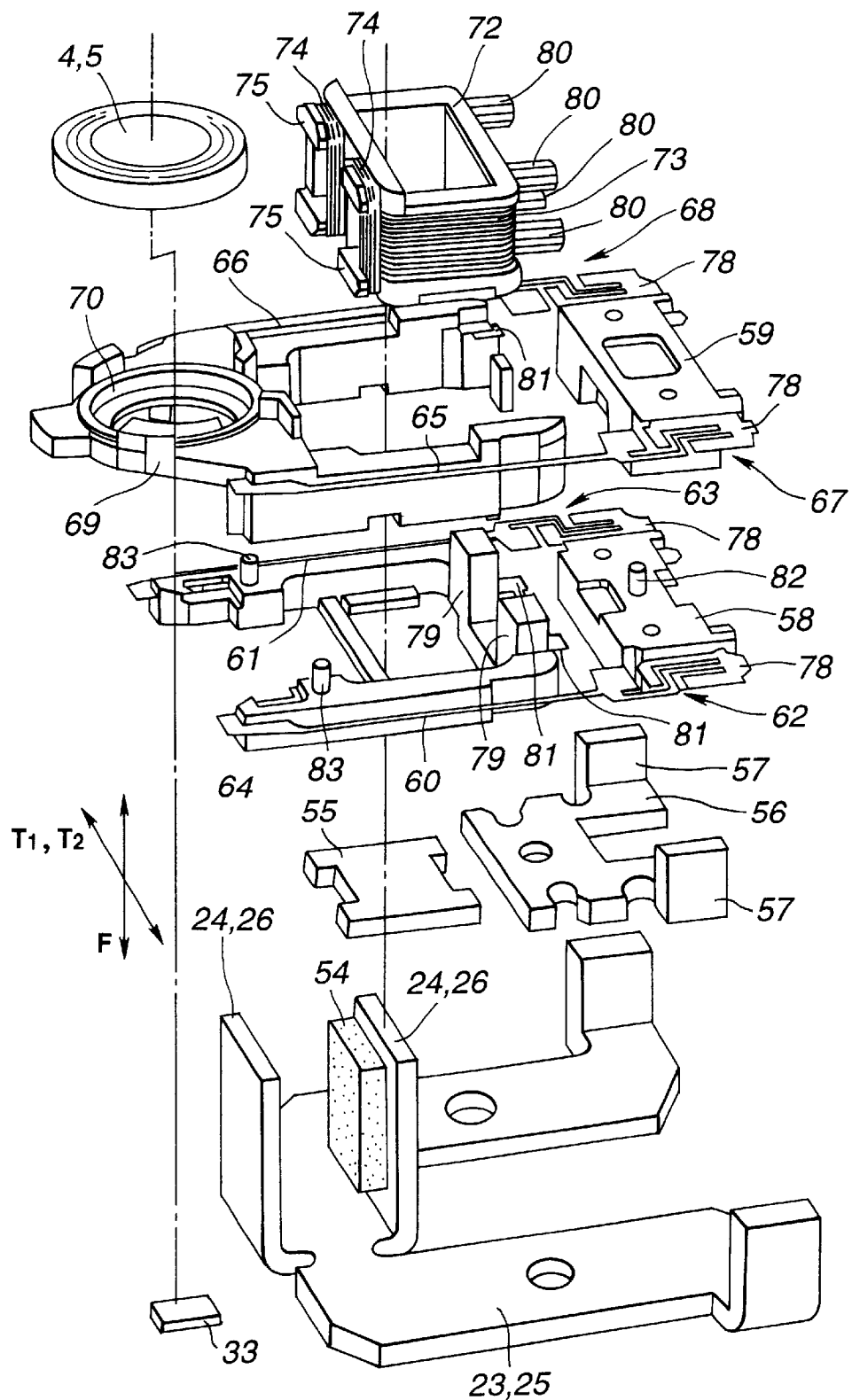
FIG. 8 is an exploded perspective view showing the construction of a biaxial actuator of the optical pickup.

As will be seen from FIG. 8, these biaxial actuators 2 and 3 have movable lens bobbin bodies 69, respectively, to which the objective lens 4 and 5 are installed, respectively. The lens bobbin body 69 is made of a synthetic resin to have a frame-like shape. The lens bobbin body 69 has a hole 70 formed in the front end portion thereof and in which the objective lens 4 or 5 is fitted. The objective lens hole 70 has the objective lens 4 or 5 fitted from above. The lens bobbin body 69 is connected at either lateral side thereof to an upper fixing block 59 by means of a pair of leaf springs 65 and 66.

The leaf springs 65 and 66 are formed integrally with each other from a metallic material having a suitable resilience such as a phosphor bronze, to have a thin and elongated shape each. The lens bobbin body 69, upper fixing block 59, and leaf springs 65 and 66 are formed, by a so-called outsert (outset) molding, so that the front end and base portions of the leaf springs 65 and 66 are buried in the lens bobbin body 69 and upper fixing block 59, respectively, for connection between them. The base portions of these leaf springs 65 and 66 are projected rearward from the rear end of the upper fixing block 59 to serve as connecting terminals, respectively. The leaf springs 65 and 66 are buried at the front end portions thereof in the lens bobbin body 69, and connected at the rear end portions thereof to terminal plates projected rearward from the rear end face of the lens bobbin body 69. The terminal plates serve as connecting terminals 81, respectively.

The lens bobbin body 69 has a bobbin support frame 64 fixed to the bottom thereof. The bobbin support frame 64 is formed from a same material as that of the lens bobbin body 69 to have a frame-like shape by which the lens bobbin body 69 is supported at both lateral portions thereof. The lens bobbin support frame 64 has formed on the top thereof a pair of positioning projections 83 by which the bobbin support frame 64 is positioned in relation to the lens bobbin body 69. The bobbin support frame 64 thus positioned relative to the lens bobbin body 69 is fixed to the lens bobbin body 69 by bonding with an adhesive. The bobbin support frame 64 is connected to a lower fixing block 58 by means of a pair of leaf springs 60 and 61.

The leaf springs 60 and 61 are formed integrally with each other from a metallic material having a suitable resilience such as a phosphor bronze, to have a thin and elongated shape each. The bobbin support frame 64, lower fixing block 58, and leaf springs 60 and 61 are formed, by a so-called outsert (outset) molding, so that the front end and base portions of the leaf springs 60 and 61 are buried in the bobbin support frame 64 and lower fixing block 58, respectively, for connection between them. The base portions of these leaf springs 60 and 61 are projected rearward from the rear end of the lower fixing block 58 to serve as connecting terminals, respectively. The leaf springs 60 and 61 are buried at the front end portions thereof in the bobbin support frame 64, and connected at the rear end portions thereof to terminal plates projected rearward from the rear end face of the bobbin support frame 64. The terminal plates serve as connecting terminals 81, respectively.

The lower and upper fixing blocks 58 and 59 are fixed to the support plate 23 for the objective lens driving mechanism and to the yoke 25 by means of a fixing plate 56. More specifically, the lower fixing block 58 is fixed to the fixing plate 56 by bonding with an adhesive, the upper fixing block 59 is fixed to the top of the lower fixing block 58 by bonding with an adhesive, and further the fixing plate 56 is fixed to the objective lens driving mechanism support plate 23 and the yoke 25 by bonding with an adhesive or by soldering, thereby forming a fixture assembly. It should be noted that the fixing plate 56 has formed at both lateral sides thereof projections 57 destined to position the lower fixing block 58. Also the lower fixing block 58 has formed on the top thereof a projection 82 intended to position the upper fixing block 59.

Each of the leaf springs 60, 61, 65 and 66 has a straight portion, and a crank portion 62, 63, 67 or 68, respectively. Each leaf spring is fixed at the base end thereof to the fixture assembly consisting of the upper and lower fixing blocks 58 and 59, and at the front end thereof to the bobbin support frame 69 or 64. The straight portions of these lead springs 60, 61, 65 and 66 are generally parallel to each other so that the leaf springs support the lens bobbin body 69 and bobbin support frame 64 displaceably in relation to the fixture assembly.

The crank portions 62, 63, 67 and 68 of the leaf springs 60, 61, 65 and 66 are provided at the base portions, respectively, of the corresponding leaf springs 60, 61, 65 and 66. The crank portions are bent 90 deg. in opposite directions at two places. Also, each of the leaf springs 60, 61, 65 and 66 has an offset limiting portion 78 which encloses the base and intermediate portions of the crank portions 62, 63, 67 and 68.

A coil bobbin 72 is installed to the bobbin support frame 64 and lens bobbin body 69. The coil bobbin 72 is a hollow square cylinder open at both the top and bottom thereof. The coil bobbin 72 is fitted in through-holes formed nearly in the centers, respectively, of the lens bobbin body 69 and bobbin support frame 64. The coil bobbin 72 is positioned by a pair of positioning projections 79 formed on the top of the bobbin support frame 64 and fixed to the lens bobbin body 69 and bobbin support frame 64 by bonding with an adhesive.

The coil bobbin 72 has a focus coil 73 and tracking coils 74 provided thereon. The focus coil 73 is wound on the lateral side (outer circumference) of the coil bobbin 72 and the central axis of the coil is parallel to the optical axes of the objective lenses 4 and 5. The tracking coils 74 are wounded on the tracking coil bobbins 75, respectively. As the tracking coil bobbins 75 are fixed onto the front end face of the coil bobbin 72, the tracking coils 74 are installed on the coil bobbin 72. The tracking coils 74 have their central axes parallel to each other, and the central axes are parallel to the straight portions of the leaf springs 60, 61, 65 and 66 and perpendicular to the optical axes of the objective lenses 4 and 5.

The beginning and ending leads of the coils 73 and 74 are connected to four terminal rods 80 projected rearward from the rear of the coil bobbin 72. The terminal rods 80 are connected, by soldering, to connecting terminals 81 projected rearward from the rear end faces of the lens bobbin body 69 and bobbin support frame 64, respectively, and which are extensions of the terminal plates buried in the lens bobbin body 69 and bobbin support frame 64.

The lens bobbin body 69, bobbin support frame 64 and coil bobbin 72 form together a lens bobbin of the biaxial actuator 2 (3).

Yokes 24 (26), front and rear, are provided in pair upright integrally on the objective lens driving mechanism support plate 23 and yoke portion 25, respectively. The support plate 23, yoke portion 25 and yokes 24 (26) are made of a magnetic material (having a high magnetic permeability)

such as iron. The rear yoke 24 (26) is introduced from below into a hollow space in the coil bobbin 72. The rear yoke 24 (26) has a magnet 54 secured on the front side thereof by bonding with an adhesive. The front yoke 24 (26) is introduced from below into the central through-holes of the bobbin support frame 64 and lens bobbin body 69, and located in front of the coil bobbin 72, namely, in front of the tracking coils 74. The yokes 74 are connected at the top ends thereof to each other by means of a coupling plate 55. The coupling plate 55 is made of a magnetic material (having a high magnetic permeability) like iron.

In the first biaxial actuator 2, the first objective lens 4 is supported movably in two different directions, that is to say, in the optical-axial direction of thereof, that is to say, in a focusing direction indicated with an arrow F in FIG. 8, and in a direction perpendicular to the optical axis, namely, in a second tracking direction indicated with an arrow T1 in FIG. 8. The second objective lens 5 is moved in the two directions under the action of an electromagnetic force developed between the coils 73, 74 and magnet 54.

In the second biaxial actuator 3, the second objective lens 5 is supported movably in two different directions, that is to say, in the optical-axial direction of thereof, in a focusing direction indicated with an arrow F in FIG. 8, and in a direction perpendicular to the optical axis, namely, in a second tracking direction indicated with an arrow T2 in FIG. 8. The second objective lens 5 is moved in the two directions under the action of an electromagnetic force developed between the coils 73, 74 and magnet 54.

As previously described, the recording track is formed spirally on the signal recording layer of the optical disc 101 (102). In the optical disc 101 (102) an, information signal is written along the recording track. The biaxial actuators 2 and 3 move the objective lenses 4 and 5, respectively, which are thus allowed to follow up with an offset of the optical disc 101 (102). That is to say, the optical pickup will always focus the light beams having passed through the objective lenses 4 and 5 onto a place on the signal recording layer on the optical disc where an information signal is to be written.

Placed opposite to the optical disc 101 (102) held at the chucking hole 103 on the disc table 40 and spun by the spindle motor 17, the optical pickup is moved radially of the optical disc 101 (102). Thus, the optical pickup will write or read the information signal into or from the recording track while being moved along the recording track on the optical disc 101 (102). Therefore, the spots of the laser beam focused by the objective lens 4 and 5 should be let to follow up with an offset of the recording track caused by an axial deflection and/or eccentricity of the optical disc. To this end, each of the biaxial actuators 2 and 3 work to move the objective lenses 4 and 5 in a focusing direction and in each tracking direction.

In the biaxial actuators 2 and 3, when the focus coil 73 is supplied with a focus drive current through each of the connecting terminals projected from the rear end faces of the fixing blocks 58 and 59 and through each of the terminal plates which are the extensions of the leaf springs 60, 61, 65 and 66, the lens bobbin body 69 is moved in a focusing direction indicated with the arrow F in FIG. 8. Also, when the tracking coils 74 are supplied with a tracking drive current through the connecting terminals projected from the rear end faces of the fixing blocks 58 and 59, each of the leaf springs 60, 61, 65 and 66 and each of the terminal plates, the lens bobbin body 69 is moved in each tracking direction indicated with the arrows T1 and T2 in FIG. 8.

In these biaxial actuators, the focus and tracking drive currents are supplied based on a focus error signal and tracking error signal indicative of offsets between the spots of the laser beams focused by the objective lenses 4 and 5 and the recording track. Therefore, synchronously with the period of spinning of the optical disc 101 (102), the objective lenses 4 and 5 are periodically moved.

The laser beam focused on the signal recording layer is modulated in reflectivity and polarizing direction correspondingly to information signal written on the signal recording layer. The reflected beam reflected from the signal recording layer returns to the objective lenses 4 and 5 through which the laser beam is detected by a photodetector unit provided inside the frame 1 as will be described later. The photodetector unit consists of a plurality of photodetectors. An output signal from the photodetector unit is processed to generate information signal read from the optical disc 101 (102), a focus error signal and a tracking error signal.

(4) Construction of the spherical adjusting mechanism

The support plate 23 for the objective lens driving mechanism is mounted on the frame 1 by means of the spherical adjusting mechanism located by the side of the first objective lens 4 supported on the first biaxial actuator 2. As shown in FIG. 6, the spherical adjusting mechanism comprises convex spherical portions 20a and 20b formed at two places, respectively, on the lateral side of the frame 1, and adjusting pieces 6 and 9 projected from the objective lens driving mechanism support plate 23 in the optical-axial direction of the first objective lens 4 and which will abut on the spherical portions 20a and 20b, respectively, from outside the frame 1. The support plate 23 for the objective lens driving mechanism is installed to the frame 1 from the bottom side of the frame 1 with the adjusting pieces 6 and 9 engaged on the spherical portions 20a and 20b, respectively. The frame 1 has formed therein a through-hole 21 through which the portion of the support plate 23 on which the first biaxial actuator 2 is mounted is allowed to face upward.

The spherical portions 20a and 20b are formed to have their centers of curvature at a same position. More particularly, when the adjusting pieces 6 and 9 are moved placed along the spherical portions 20a and 20b, respectively, the support plate 23 for the objective lens driving mechanism is moved on a sphere of which the center coincides with the centers of curvature of the spherical portions 20a and 20b.

Figure 9:
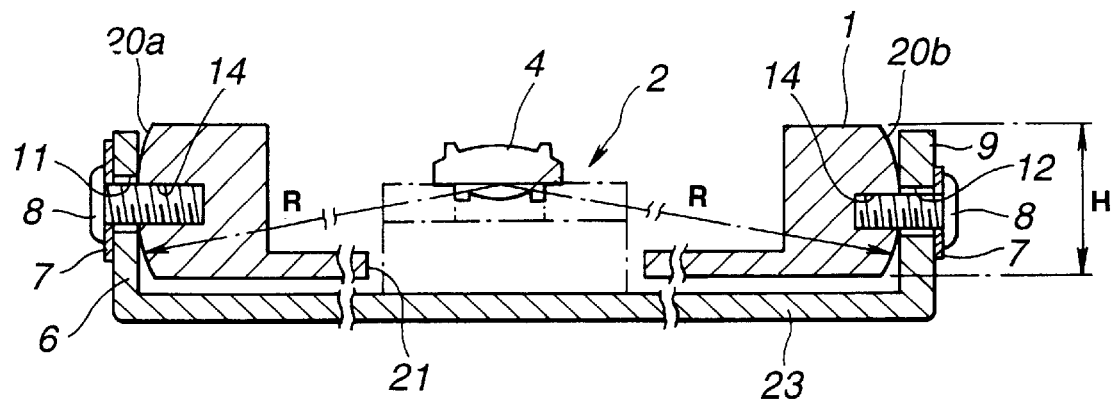
FIG. 9 is an axial-sectional view showing the construction of an embodiment of a spherical adjusting mechanism of the optical pickup.
Figure 11:
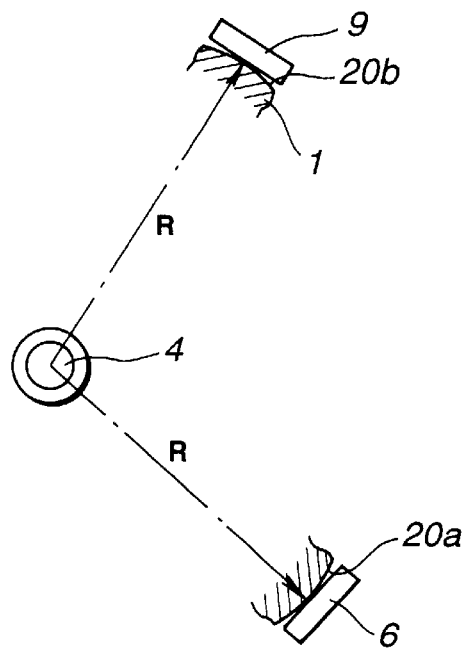
FIG. 11 is a plan view showing the construction of the essential portions of the spherical adjusting mechanism.

The center of curvature of the spherical portions 20a and 20b is such that when the support plate 23 for the objective lens driving mechanism is pivoted about the center of curvature, a beam spot of a first laser beam incident upon the first objective lens 4 and then focused thereby will have a least offset. That is to say, the centers of curvature of the spherical portions 20a and 20b lie on the optical axis of the first objective lens 4 as shown in FIG. 11, and also in a reference plane for the lens bobbin body 69 for the first objective lens 4 as will be seen from FIG. 9.

Also the centers of curvature of the spherical portions 20a and 20b are located at a position where a plane passing through the centers and perpendicular to the optical axis of the first objective lens 4 intersects the spherical portions 20a and 20b. Furthermore, the positional relation between the first objective lens 4 and spherical portions 20a and 20b is such that a plane exists which is perpendicular to the first objective lens 4, intersects the spherical portions 20a and 20b and passes through the first objective lens 4. Namely, when the first objective lens 4 is in its neutral position, it has at least a portion thereof lying within the height of the spherical portions 20a and 20b indicated with an arrow H in FIG. 9.

After the support plate 23 for the objective lens driving mechanism is adjusted in position along the spherical portions 20a and 20b, it is fixed to the frame 1.

Figure 10:
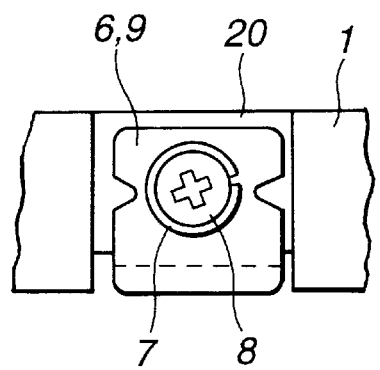
FIG. 10 is a front view showing the construction of essential portions of the spherical adjusting mechanism.

More specifically, each of the spherical portions 20a and 20b has an internally threaded screw hole 14 nearly in the center thereof. Also, the adjusting pieces 6 and 9 have screw holes 11 and 12, respectively, nearly in the centers thereof. As shown in FIG. 10, the spherical adjusting mechanisms comprises provisionally fixing spring washers 7 for resiliently pressing the support plate 23 and frame 1 to each other on the spherical portions 20a and 20b, and fixing screws 8 securely fixing the support plate 23 and frame 1 to each other. The fixing screws 8 are passed through the screw holes 11 and 12, respectively, in the adjusting pieces 6 and 9 and driven into the internally threaded holes 14 in the spherical potions 20a and 20b, respectively. The spring washers 7 are fitted on the fixing screws 8, respectively, between the heads of the screws 8 and adjusting pieces 6 and 9, respectively.

In the spherical adjusting mechanism, while the fixing screws 8 are slightly loosened and the adjusting pieces 6 and 9 are resiliently pressed to the spherical portions 20a and 20b, respectively, under the action of the spring washer 7, the support plate 23 for the objective lens driving mechanism is moved to adjust the tilt of the first biaxial actuator 2 relative to the frame 1. After completion of this adjustment, the fixing screws 8 are tightened to fix the support plate 23 to the frame 1. It should be noted that the tilt of the first biaxial actuator 2 in relation to the frame 1 is adjusted by seeking, while reading the information signal from the optical disc 101 of the first type, a position of the first biaxial actuator 2 where the information signal can be best read from the optical disc 101.

In the spherical adjusting mechanism, the spherical portions 20a and 20b being a reference for skew adjustment of the first objective lens 4 during the adjustment of the tilt of the support plate 23 in relation to the frame 1 are provided by the side of the first objective lens 4, so that even if there is an error in radius R of curvature of the spherical portions 20a and 20b, it is possible to prevent any error from taking place in the position of the first objective lens 4 in its optical-axial direction. Also, a positional error of the first objective lens 4 in a direction perpendicular to its optical-axial direction can be absorbed by adjusting the fixed position of the first biaxial actuator 2 relative to the support plate 23 for the objective lens driving mechanism.

Also in the spherical adjusting mechanism, since the support plate 23 is fixed to the adjusting pieces 6 and 9 with the latter made to abut directly on the spherical portions 20a and 20b, respectively, it can be securely fixed to the frame 1 so that the support plate 23 will not possibly be offset due to a shock after fixed.

Figure 12:
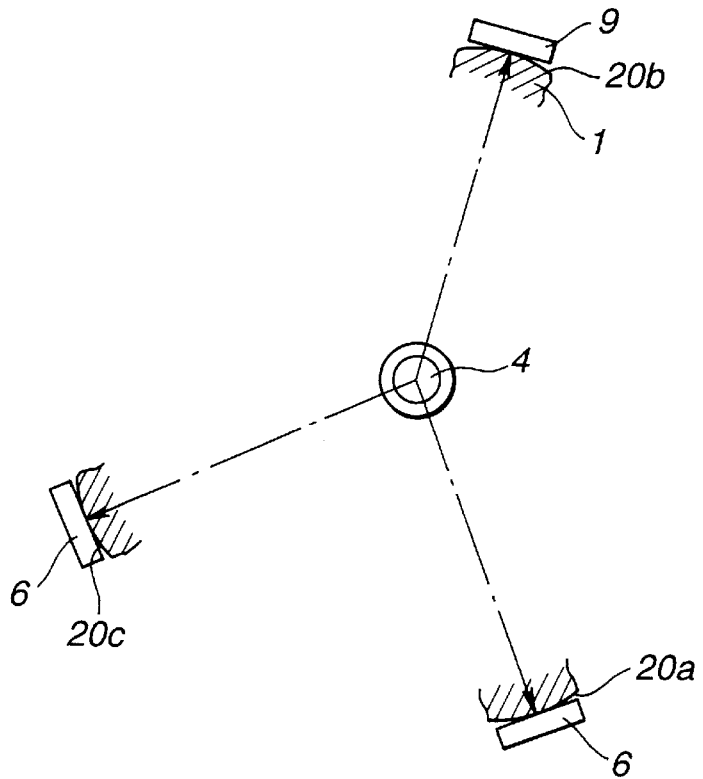
FIG. 12 is a plan view showing another example of the construction of the essential portions of the spherical adjusting mechanism.
Figure 13:
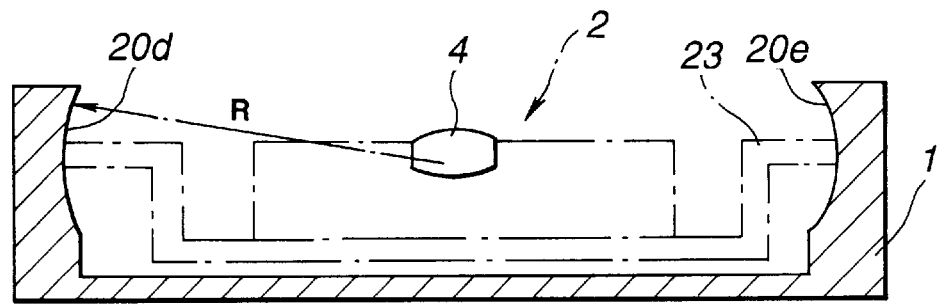
FIG. 13 is an axial-sectional view showing the construction of a second embodiment of the spherical adjusting mechanism.
Figure 14:
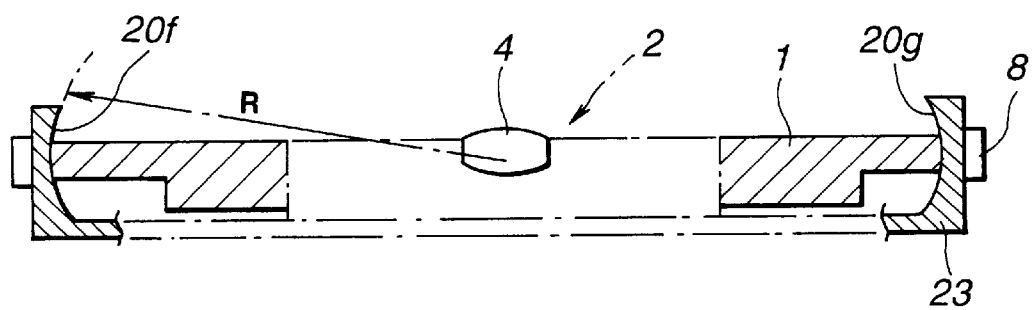
FIG. 14 is an axial-sectional view showing the construction of a third embodiment of the spherical adjusting mechanism.
Figure 15:
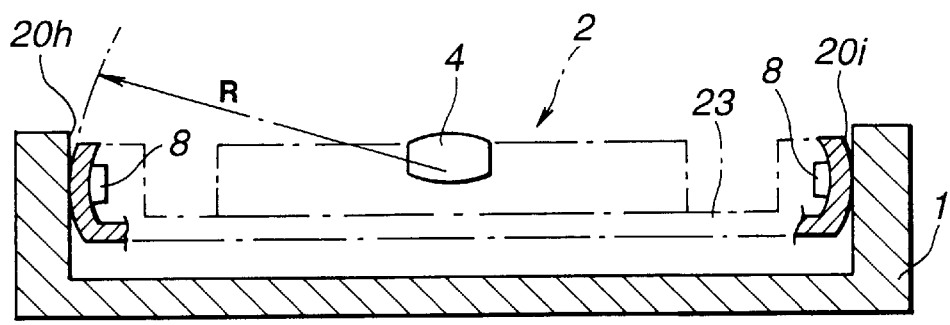
FIG. 15 is an axial-sectional view showing the construction of a fourth embodiment of the spherical adjusting mechanism.

Note that more than three spherical adjusting mechanisms may be formed on the frame 1 as shown in FIG. 12. Moreover, the spherical adjusting mechanism may have concave spherical portions 20d and 20e in place of the spherical portions 20d and 20e as shown in FIG. 13. In this case, the outer edge of the support plate 23 for the objective lens driving mechanism abuts on the spherical portions 20d and 20e. Furthermore, the spherical adjusting mechanism may have concave spherical portions 20f and 20g in place of the spherical portions 20d and 20e as shown in FIG. 14. The spherical portions 20f and 20g are provided on the support plate 23 for the objective lens driving mechanism support plate 23. In this case, the outer edge of the support plate 23 abuts on the spherical portions 20f and 20g. Also, the spherical adjusting mechanism may have convex spherical portions 20h and 20i in place of the spherical portions 20f and 20g as shown in FIG. 15. The spherical portions 20h and 20i are provided on the support plate 23. In this case, the lateral wall provided outside the frame 1 abuts on the spherical portions 20h and 20i.

(5) Internal construction of the frame

Inside the frame 1, there are provided a semiconductor laser 38 being a first light source, and a laser coupler 33 being a light emitter/photodetector element having a semiconductor laser chip being a second light source, as shown in FIG. 7. The semiconductor laser 38 and semiconductor laser chip of the laser coupler 33 emit first and second laser beams, respectively, which are a linearly polarizing coherent light. The laser beams are divergent. The first laser beam emitted from the semiconductor laser 38 has a first wavelength of 635 nm or 650 nm. The second laser beam emitted from the semiconductor laser chip of the laser coupler 33 has a second wavelength of 780 nm.

A high-frequency module circuit board 37 is connected to the semiconductor laser 38. The high-frequency module circuit board 37 has a high-frequency circuit which drives the semiconductor laser 38 with a high frequency of about 300 mHz to 400 MHz.

As shown in FIG. 6, the semiconductor laser 38 is fitted in a fixing hole formed in the frame 1, and fixed to the frame 1. The first laser beam emitted from the semiconductor laser 38 is incident upon a flat beam splitter 28 through a diffraction grating 39. The grating 39 branches the first laser beam into three laser beams including a zero-order component and two first-order components, positive and negative. The beam splitter 28 is disposed with its main face positioned at an angle of 45 deg. relative to the optical axis of the first laser beam. The beam splitter 28 allows a part of the first laser beam to pass through it while reflecting the remainder. The first laser beam reflected by the beam splitter 28 is incident upon a collimator lens 29 which will form it into a first parallel laser beam.

The first parallel laser beam having passed through the collimator lens 29 is reflected by a first rising mirror 30 to deflect through an angle of 90 deg. The deflected laser beam is incident upon the first objective lens 4 which will focus the first parallel laser beam onto the signal recording layer of the optical disc 101 of the first type.

The first laser beam focused on the signal recording layer of the optical disc 101 of the first type is reflected by the signal recording layer, travels through the first objective lens 4, first rising mirror 30 and collimator lens 29 and beam splitter 28, and then detected by the photodetector 32.

The laser coupler 33 comprises a semiconductor laser chip, and first and second photodetectors disposed on a same semiconductor substrate. The semiconductor laser chip is disposed on the semiconductor substrate with a heat sink laid between them. Each of the photodetectors is divided into a plurality of light detection surfaces laid on the semiconductor substrate.

In the laser coupler 33, a beam splitter prism is disposed above each of the photodetectors with its beam splitting face directed toward the semiconductor laser chip. The beam splitting face is an inclined one formed with a predetermined tilt angle with respect to the top surface of the semiconductor substrate.

Also in the laser coupler 33, the semiconductor laser chip emits a second laser beam toward the beam splitting face of the beam splitter prism. The second laser beam emitted from the semiconductor laser chip is reflected by the beam splitting face in a vertical upward direction with respect to the semiconductor substrate.

The second laser beam emitted from the laser coupler 33 is reflected by a bending mirror 10 and thus deflected through an angle of 90 deg., further reflected by a rising mirror 34 and thus deflected through an angle of 90 deg., and then incident upon the second objective lens 5. The second laser beam incident upon the second objective lens 5 passes through the clear substrate of the optical disc 102 of the second type, and focused onto the surface of the signal recording layer of the optical disc 102.

The second laser beam focused on the signal recording layer of the optical disc 102 of the second type is reflected by the signal recording layer, travels through the second objective lens 5, second rising mirror 34 and bending mirror 10, and then detected by the laser coupler 33.

In this optical pickup, the first optical path from the semiconductor laser 38 to the first objective lens 4 and the second optical path from the laser chip of the laser coupler 33 to the second objective lens 5 intersect each other within the frame 1. On the first optical path, the intersection lies between the collimator lens 29 and first rising mirror 30. On the second optical path, the intersection lies between the bending mirror 10 and second rising mirror 34. In this optical pickup, since the first and second optical paths thus intersect each other, the sum of the volumes occupied by these optical paths is reduced for the intersection of the paths.

(6) Construction of the optical disc player

An optical disc player incorporating the optical pickup according to the present invention comprises a circuit to discriminate the type of a disc-like optical recording medium set on the disc table 40, a control circuit and a controller to provide various kinds of control based on signals delivered from the control circuit.

The control circuit controls the pickup, spindle motor 17 and sled motor based on the various signals supplied. More particularly, the control circuit controls the operations of the elements in the optical pickup, such as the driving of each the biaxial actuators 2 and 3, on-off operation of the semiconductor laser and semiconductor laser chip. Also, the control circuit controls the operations of the spindle motor 17 and sled motor.

Further, when a disc-like optical recording medium set on the disc table 40 is judged to be an optical disc 101 of the first type, the control circuit will turn on the first semiconductor laser 38 but off the semiconductor laser chip of the laser coupler 33. Then, the first laser beam having passed through the first objective lens 4 is irradiated onto the optical disc 101 of the first type from the clear substrate side of the optical disc 101, passed through the clear substrate and focused onto the signal recording layer. The first objective lens 4 is moved by the first biaxial actuator 2 in the optical-axial direction of the first objective lens 4 and in a direction perpendicular to the optical axis. The first objective lens 4 is moved by the first biaxial actuator 2 to follow up with an offset of the optical disc 101 of the first type in the optical-axial direction of the first objective lens 4, that is to say, an axial deflection of the optical disc 101, the focused spot of the laser beam is always positioned on the signal recording layer. Also, the first objective lens 4 is moved by the first biaxial actuator 2 to follow up with an offset of the recording track on the optical disc 101 of the first type in a direction perpendicular to the optical axis of the first objective lens 4, the focused spot of the first laser beam is always positioned on the recording track.

In this optical pickup, the first laser beam is focused onto the signal recording layer of the optical disc 101 of the first type to write or read information signal into or from the signal recording layer. For writing information signal into the optical disc 101 of the first type which is a magneto-optic disc, the first laser beam is irradiated onto the magneto-optic disc and an external magnetic field is applied to the focused spot of the first laser beam. Either the optical output of the first laser beam or the intensity of the external magnetic field is modulated based on a to-be-written information signal to write the information signal into the magneto-optic disc. When the optical disc 101 of the first type is a phase-change type disc, the optical output of the first laser beam is modulated based on a to-be-written information signal to write the information signal into the phase-change type disc.

To read information signal from the signal recording layer of the optical disc 101 of the first type, the first laser beam is focused onto the signal recording layer, and the reflected light of the laser beam from the signal recording layer is detected.

For reading information signal from the optical disc 101 of the first type which is a magneto-optic disc, a change in polarizing direction of the reflected light. Also, when the optical disc 101 of the first type is a phase-change type disc or a pit disc, a change in reflected amount of the light is detected to read information signal from the phase-change type or pit disc.

More particularly, the first laser beam focused on the signal recording layer is reflected by the signal recording layer and returns to the first objective lens 4. The reflected light is formed by the first objective lens 4 into a parallel light beam which will travel through the collimator lens 29 to the beam splitter 28. Then the reflected light passes through the beam splitter 28, is branched to a return optical path to the semiconductor laser 38 and goes toward the photodetector 32.

The beam splitter 28 has a parallel flat plate inclined through an angle of 45 deg. relative to the optical axis of the reflected light to cause an astigmatic aberration in the reflected light. When the optical disc 101 of the first type is a magneto-optic disc, the reflected light deflected by the beam splitter 28 goes toward the photodetector 32 through a Wollanston prism (not illustrated) which branches the incoming reflected light into a first polarized component directed in the polarizing direction of the reflected light, a second polarized component directed through an angle of +45 deg. relative to the polarizing direction of the reflected light, and a third polarized component directed through an angle of −45 deg. relative to the polarizing direction of the reflected light.

The photodetector 32 comprises the grating 39 and a plurality of photodiodes for the plurality of the light beams generated through branching by the Wollanston prism to detect the light beams by the respective photodiodes. A light detection output from each of the photodiodes of the photodetector 32 is processed to generate a signal of information read from the magneto-optic disc, a focus error signal and a tracking error signal. The focus error signal is indicative of an offset, in the optical-axial direction of the first objective lens 4, between the spot of the first laser beam focused by the first objective lens 4 and the surface of the signal recording layer of the optical disc 101 of the first type, and a direction of the offset. The tracking error signal is indicative of an offset, in a direction perpendicular to the optical-axial direction of the first objective lens 4, between the spot of the first laser beam focused by the first objective lens 4 and the recording track on the optical disc 101 of the first type, and a direction of the offset. The first biaxial actuator 2 is driven based on the focus and tracking error signals.

In the photodetector 32, the photodiode upon which the reflected light of the zero-order component of the first laser beam, coming from the signal recording layer, is incident, has four light detection surfaces disposed radially of the optical axis of the reflected light. The reflected light incident upon these four light detection surfaces forms an elliptic beam spot of which the longer axis is in line with the direction of the astigmatism caused by the beam splitter 28. Assume that light detection outputs from the four light detection surfaces are a, b, c and d, respectively. A direction and magnitude of the astigmatism of the reflected light can be expressed with the following relation:

$$Fe=(a+c)-(b+d)$$

where Fe is a focus error signal indicating an offset between the spot of the first laser beam focused by the first objective lens 4 and the signal recording layer of the optical disc 101 of the first type, and a direction of the offset.

The first biaxial actuator 2 is driven based on the focus error signal Fe to move the first objective lens 4 correspondingly. Thus, the spot of the first laser beam focused by the first objective lens 4 is always positioned on the signal recording layer, which is called "focus servo control".

In the photodetector 32, the photodiode upon which the reflected light of the positive and negative first-order components of the first laser beam, coming from the signal recording layer, is incident, has two independent light detection surfaces. The amounts of reflected lights of the positive and negative first-order components of the first laser beam are equal to each other when the spot of the zero-order component of the first laser beam is on the recording track. Assume here that optical outputs from the two light detection surfaces are e and f, respectively. A signal indicative of a difference in amount of reflected light between the positive and negative first-order components can be expressed with the following relation:

$$Te=e-f$$

where Te is a tracking error signal indicating an offset between the spot of the zero-order component of the first laser beam focused by the first objective lens 4 and the recording track of the optical disc 101 of the first type, and a direction of the offset.

The first biaxial actuator 2 is driven based on the tracking error signal Te to move the first objective lens 4 correspondingly. Thus, the spot of the zero-order component of the first laser beam focused by the first objective lens 4 is always positioned on the recording tack, which is called "tracking servo control".

The optical pickup is moved along the guide shaft 18 and support shaft 19 for the first objective lens 4 to cover the entire signal recording area on the optical disc 101 of the first type for information signal write and/or read with respect to the entire signal recording area. More particularly, the optical pickup is moved along the outer and inner circumferences of the optical disc 101 of the first type and the optical disc 101 is spun, so that information signal can be written and/or read with respect to the entire signal recording area on the optical disc 101 of the first type.

In this optical pickup, a tracking error of the optical disc is detected by the above-mentioned so-called three-beam method. As shown in FIG. 4, the first objective lens 4 in this optical pickup is moved along the outer and inner circumferences of the optical disc 101 of the first type while the optical axis of the first objective lens 4 is kept opposite to a straight line passing through the center of the optical disc 101, namely, through the center of the disc table 40, that is to say, while it is kept intersected with a straight line passing through the center of the optical disc 101.

It should be noted that a so-called one-beam method may be adopted for detecting a tracking error of the first laser beam. In this case, the grating 39 is not provided. Also, a so-called push-pull method, a phase difference method including a so-called V-DPD method, or a wobbling method may be employed for the tracking error detection. In any of these cases, when the frame 1 is moved, the first objective lens 4 may not be kept opposite to a straight line passing through the center of the optical disc 101 of the first type.

When an optical disc set on the disc table 40 is determined to be an optical disc 102 of the second type, the control circuit turns on the semiconductor laser chip of the laser coupler 33 while turning off the semiconductor laser 38. Then, a second laser beam having passed through the second objective lens 5 is irradiated onto the optical disc 102 of the second type from the clear substrate side of the optical disc 102, passes through the clear substrate and focused onto the signal recording layer. The second objective lens 5 is moved by the second biaxial actuator 3 in the optical-axial direction of the optical disc 102 and in a direction perpendicular to the optical axis. The second objective lens 5 is thus moved following up with an offset of the optical disc 102 in the optical-axial direction of the second objective lens 5, that is to say, with an axial deflection of the optical disc 102, so that the focused spot of the second laser beam is always positioned on the signal recording layer. Also, the second objective lens 5 is moved following up with an offset of the recording track of the second objective lens 5 in a direction perpendicular to the optical axis of the second objective lens 5, so that the focused spot of the second laser beam is always positioned on the recording track.

The optical pickup focuses the second laser beam onto the signal recording layer of the optical disc 102 of the second type to read an information signal from the signal recording layer. More particularly, the second laser beam is focused onto the signal recording layer of the optical disc 102, and a reflected light of the second laser beam from the signal recording layer is detected to read the information signal from the signal recording layer. This reading of the information signal is done by detecting a change in amount of the reflected laser beam.

That is to say, the second laser beam focused onto the surface of the signal recording layer is reflected by the signal recording layer, and returns to the second objective lens 5. The reflected light back to the second objective lens 5 travels through the second rising mirror 34 and bending mirror 10, and then is incident upon the beam splitter surface of the laser coupler 33.

The reflected laser beam back to the beam splitter passes through the beam splitter surface, and enters the beam splitter prism which branches the laser beam from the optical path back to the semiconductor laser chip for detection by the first photodetector. Also, the reflected light beam is reflected by the surface of the first photodetector and inner surface of the beam splitter prism, and thus detected by the second photodetector as well.

An information signal read from the optical disc 102 of the second type, namely, an RF signal, a focus error signal Fe indicative of an offset of the spot of the second laser beam focused by the second objective lens 5 from the surface of the signal recording layer in the optical-axial direction of the objective lens 5, that is to say, a focus error, and a tracking error signal Te indicative of an offset of the focused spot of the laser beam from the recording track formed on the surface of the signal recording layer in the optical-axial direction of the second objective lens 5 and in a direction perpendicular to the optical axis, namely, a tracking error, are calculated based on the light detection output from each photodetector.

Namely, the above read signal is provided as a sum of the light detection outputs from the photodetectors. The focus error signal Fe is provided as a difference between the light detection outputs from the photodetectors.

Furthermore, the tracking error Te is a difference between a sum of a light detection output A from the light detection surface on one side of the first photodetector and a light detection output D from the light detection surface on the other side of the second photodetector, and a sum of the light detection output B from the light detection surface on the other side of the first photodetector and the light detection output C from the light detection surface on the one side of the second photodetector, namely, (A+D)−(B+C).

In each of the photodetectors, the line separating the light detection surface on the one side and that on the other side from each other, forms an angle of 45 deg. with respect to a tangential direction of the recording track of the optical disc 102 of the second type.

That is to say, this optical pickup adopts the above-mentioned so-called one-beam push-pull method for the optical disc 102 of the second type to detect a tracking error.

The optical pickup is moved along the guide shaft 18 and support shaft 19 so that the second objective lens 5 can be moved facing the entire signal recording area of the optical disc 102 of the second type, thereby reading information signal from the signal recording area. Namely, the optical pickup is moved along the inner and outer circumferences of the optical disc 102 of the second type and the optical disc 102 is spun so that information signal can be read from the entire signal recording area of the optical disc 102.

As mentioned above, in the optical pickup according to the present invention, the spherical adjusting mechanism being a reference for the objective lens skew adjustment attainable through adjustment of the tilt of the support plate for the objective lens driving mechanism, is provided at the lateral sides of the objective lens.

Thus, even if the radius of curvature of the spherical surface of the spherical adjusting mechanism is erroneous, it is possible to prevent a positional error in the optical-axial direction of the objective lens. Also, a positional error in a direction perpendicular to the optical axis of the objective lens can be absorbed by adjusting the fixed position of the objective lens driving mechanism relative to the support plate for the objective lens driving mechanism.

That is to say, the present invention can provide an optical pickup, and an optical disc player incorporating the optical disc, capable of an easy and good adjustment of the objective lens skew, compact in the optical-axial direction of the objective lens, and having a reducible light-projected area in a plane perpendicular to the optical axis.

What is claimed is:

1. An optical pickup, comprising:

a light source to emit a light beam;

a frame having provided therein photodetectors upon which incoming light beam is incident;

an objective lens;

an objective lens driving mechanism to support the objective lens movably in a direction parallel to the optical axis of the objective lens; and a support plate installed on the frame to fix the objective lens driving mechanism;

the objective lens driving mechanism support plate being mounted on the frame with a spherical adjusting mechanism provided between them, the spherical adjusting mechanism being located at the lateral sides of the objective lens supported by the objecting lens driving mechanism, the support plate for the objective lens driving mechanism being mounted on the frame by means of the spherical adjusting mechanism, the support plate being fixed after adjusted in position and/or angle along the spherical adjusting mechanism.

2. The optical pickup as set forth in claim 1, wherein the center of curvature of the spherical surface of the spherical adjusting mechanism is positioned so that when the objective lens driving mechanism support plate is pivoted about the center of curvature, an offset of a beam spot of a light beam incident upon, and focused by, the objective lens is minimum.

3. The optical pickup as set forth in claim 1, wherein the center of curvature of the spherical surface of the spherical adjusting mechanism lies on the optical axis of the objective lens and in a position where a plane passing through the center of curvature and perpendicular to the optical axis intersects the spherical surface.

4. The optical pickup as set forth in claim 2, wherein the objective lens and spherical adjusting mechanism are in such a positional relation that a plane exists which is perpendicular to the optical axis of the objective lens, intersects the spherical surface of the spherical adjusting mechanism and passes through the objective lens.

5. The optical pickup as set forth in claim 1, wherein the spherical adjusting mechanism is formed at least in two positions on the frame.

6. The optical pickup as set forth in claim 5, wherein the spherical adjusting mechanism is formed in two positions on the frame, and comprises:

a provisional-fixing member for resiliently pressing the objective lens driving mechanism support plate and frame to the spherical surface of the spherical adjusting mechanism; and a fixing member for securely fixing the support plate and frame to each other.

7. The optical pickup as set forth in claim 1, wherein the objective lens driving mechanism comprises a lens holder for the objective lens, a coil mounted on the lens holder, a resilient support member for supporting the lens holder displaceably, and means for generating a magnetic field toward the coil.

8. An optical pickup, comprising:

a first objective lens driving mechanism for supporting a first objective lens movably in a direction parallel to at least the optical axis of the objective lens;

a second objective lens driving mechanism for supporting a second objective lens movably in a direction parallel to at least the optical axis of the objective lens; and a frame on which the first and second objective lens driving mechanisms are installed;

the objective lens driving mechanism support plate being mounted on the frame with a spherical adjusting mechanism provided between them, the spherical adjusting mechanism being located at the lateral sides of the objective lens supported by the objecting lens driving mechanism, the support plate for the objective lens driving mechanism being mounted on the frame by means of the spherical adjusting mechanism, the support plate being fixed after adjusted in position and/or angle along the spherical adjusting mechanism.

9. The optical pickup as set forth in claim 8, wherein the center of curvature of the spherical surface of the spherical adjusting mechanism is positioned so that when the objective lens driving mechanism support plate is pivoted about the center of curvature, an offset of a beam spot of a light beam incident upon, and focused by, the objective lens is minimum.

10. The optical pickup as set forth in claim 9, wherein the center of curvature of the spherical surface of the spherical adjusting mechanism lies on the optical axis of the objective lens and in a position where a plane passing through the center of curvature and perpendicular to the optical axis intersects the spherical surface.

11. The optical pickup as set forth in claim 9, wherein the objective lens and spherical adjusting mechanism are in such a positional relation that a plane exists which is perpendicular to the optical axis of the objective lens, intersects the spherical surface of the spherical adjusting mechanism and passes through the objective lens.

12. The optical pickup as set forth in claim 8, wherein the spherical adjusting mechanism is formed at least in two positions on the frame.

13. The optical pickup as set forth in claim 12, wherein the spherical adjusting mechanism is formed in two positions on the frame, and comprises:

a provisional-fixing member for resiliently pressing the objective lens driving mechanism support plate and frame to the spherical surface of the spherical adjusting mechanism; and a fixing member for securely fixing the support plate and frame to each other.

14. The optical pickup as set forth in claim 8, wherein the objective lens driving mechanism comprises a lens holder for the objective lens, a coil mounted on the lens holder, a resilient support member for supporting the lens holder displaceably, and means for generating a magnetic field toward the coil.

15. The optical pickup as set forth in claim 8, wherein the frame has provided inside it a first light source to emit a light beam having a first wavelength toward the first objective lens, and a second light source to emit a light beam having a second wavelength toward the second objective lens.

16. The optical pickup as set forth in claim 15, wherein the numerical aperture of the first objective lens is larger than that of the second objective lens, and the wavelength of the light beam from the first light source is shorter than that of the light beam from the second light source.

17. An optical disc player, comprising:

an optical pickup to irradiate a light beam to an optical disc and receive a return light from the optical disc;

means for moving the optical pickup radially of the optical disc; and means for spinning the optical disc;

the optical pickup, comprising:

a light source to emit a light beam;

a frame having provided therein photodetectors upon which incoming light beam is incident;

an objective lens;

an objective lens driving mechanism to support the objective lens movably in a direction parallel to the optical axis of the objective lens; and a support plate installed on the frame to fix the objective lens driving mechanism;

the objective lens driving mechanism support plate being mounted on the frame with a spherical adjusting mechanism provided between them, the spherical adjusting mechanism being located at the lateral sides of the objective lens supported by the objective lens driving mechanism, the support plate for the objective lens driving mechanism being mounted on the frame by means of the spherical adjusting mechanism, the support plate being fixed after adjusted in position and/or angle along the spherical adjusting mechanism.

18. The optical disc player as set forth in claim 17, wherein the center of curvature of the spherical surface of the spherical adjusting mechanism is positioned so that when the objective lens driving mechanism support plate is pivoted about the center of curvature, an offset of a beam spot of a light beam incident upon, and focused by, the objective lens is minimum.

19. The optical disc player as set forth in claim 18, wherein the center of curvature of the spherical surface of the spherical adjusting mechanism lies on the optical axis of the objective lens and in a position where a plane passing through the center of curvature and perpendicular to the optical axis intersects the spherical surface.

20. The optical disc player as set forth in claim 18, wherein the objective lens and spherical adjusting mechanism are in such a positional relation that a plane exists which is perpendicular to the optical axis of the objective lens, intersects the spherical surface of the spherical adjusting mechanism and passes through the objective lens.

21. The optical disc player as set forth in claim 17, wherein the spherical adjusting mechanism is formed at least in two positions on the frame.

22. The optical disc player as set forth in claim 17, further comprising another objective lens driving mechanism provided inside the frame.

* * * * *